United States Patent [19]

Eastin

[11] 3,934,051

[45] Jan. 20, 1976

[54] PRODUCTION OF DRIED SODIUM CASEINATE WITH UNIFORM CONTENT OF TRACING COMPOUND FOR USE IN SAUSAGE

[75] Inventor: William C. Eastin, Sebastopol, Calif.

[73] Assignee: Western Dairy Products Division of Chelsea Industries, Inc., San Francisco, Calif.

[22] Filed: Aug. 2, 1974

[21] Appl. No.: 494,047

[52] U.S. Cl. ............... 426/652; 426/231; 426/646; 426/656
[51] Int. Cl.² ............................................ A23L 1/31
[58] Field of Search .......... 426/185, 186, 231, 356, 426/360, 364, 371, 646, 652, 656

[56] References Cited
UNITED STATES PATENTS

| | | | |
|---|---|---|---|
| 2,964,409 | 12/1960 | Sair | 426/356 |
| 3,179,521 | 4/1965 | Poarch | 426/360 |
| 3,420,811 | 1/1969 | Van Wieren et al. | 426/364 X |

OTHER PUBLICATIONS

Rose et al., "The Condensed Chemical Dictionary," 1966, Published by Reinhold Publishing Corporation, New York, p. 875, article entitled *Sodium Stannate*.

*Primary Examiner*—Hyman Lord
*Attorney, Agent, or Firm*—Naylor, Neal & Uilkema

[57] ABSTRACT

A tracer compound, tin, is added to sodium caseinate in such a way as to be uniformly distributed throughout, and an amount of the tin is traced into a comminuted meat product to precisely determine the amount of sodium caseinate which has been added to the meat product.

7 Claims, No Drawings

PRODUCTION OF DRIED SODIUM CASEINATE WITH UNIFORM CONTENT OF TRACING COMPOUND FOR USE IN SAUSAGE

This invention relates to the preparation of sodium caseinate containing known trace amounts of tin which can be used to determine the amount of such sodium caseinate which may have been added to comminuted meat products under regulation by the Meat Inspection Division of the U.S. Department of Agriculture.

Sodium caseinate is well known to the sausage making industry as a useful additive having the object of improving the physical characteristics of sausage products including a higher density, firmer texture and less free fat as compared to products made without it.

However, because of the similarity of the proteins it is impossible to analyze comminuted meat products directly to determine whether or not sodium caseinate had been added and the level of use. Its use has therefore been outlawed in certain meat products coming under the control of the Meat Inspection Division in spite of the fact that it is a wholesome, nutritious and useful additive.

A method of allowing the detection and estimation of sodium caseinate in sausage products consists of marketing sodium caseinate containing known small amounts of a compound or element not normally found in sausage. This "tracer" can then be analyzed for in the sausage sample and the amount of sodium caseinate used in manufacture calculated.

The idea of using a tracer in this way is not new. Titanium dioxide is used as a tracer to allow the addition of soya protein to sausage products. However, a great deal of difficulty is encountered in obtaining a sufficiently uniform dispersion of the tracing agent throughout the bulk of the protein to insure that a given increment will always contain the same amount of tracer element.

An object of this invention is to provide a form of sodium caseinate containing small amounts of an easily identified element uniformly dispersed in it at a known level. This element can then act as a tracer which can be analyzed for in any meat product containing such traceable sodium caseinate and thereby enable the amount of sodium caseinate present to be calculated.

An element possessing requirements necessary to such a tracer is tin. Normal sausage products do not contain measurable amounts. It is not toxic at the 10 parts per million level which is considered to be a maximum for use as a tracer, and simple, accurate methods for quantitative analysis of trace amounts are available.

The major problem in such a tracer system lies in obtaining first a uniform dispersion of the tracing agent and second a dispersion which will remain uniform, i.e. no segregation of tracer will occur on handling and storage of the product prior to its use in sausage.

It has been determined that simple addition of an insoluble tin compound such as stannic oxide to sodium caseinate followed by even the most thorough mixing does not result in a uniform distribution of tin.

For example, 14.43 grams of $SnO_2$ was sprinkled slowly into 50 lb. of sodium caseinate as it was being mixed in a ribbon blender. The mixing action was continued for one hour after which samples were taken from the top, middle and bottom of the mixer and analyzed for tin with the following results:

| Location | % Sn |
|---|---|
| Top | 0.020 |
| Middle | 0.070 |
| Bottom | 0.024 |

A second experiment was made in which 14.43 grams of $SnO_2$ was premixed by spoon with a small amount of sodium caseinate in a beaker to insure breakup of any agglomerates. This concentrate was then added to 50 lb. of sodium caseinate being mixed in a ribbon blender and the mixing continued for 1½ hours. The top, middle and bottom was analyzed for tin with results similar to the above. Mixing was then continued for 24 hours, the mixture resampled and the samples analyzed for tin with the following results:

| Location | % Sn |
|---|---|
| Top | .039 |
| Middle | .034 |
| Bottom | .050 |

It is thus evident that when $SnO_2$ is added to dry sodium caseinate, it is very difficult to obtain a uniform blend.

Sodium caseinate is manufactured by treating a suspension of casein in water with caustic soda resulting in a homogeneous liquid colloidal solution which shows no tendency for casein solids to settle out. This liquid is then spray dried to obtain a dry powder. If $SnO_2$ is added to this solution prior to drying, the $SnO_2$ exhibits a marked tendency to settle out making it difficult to produce a product with a uniform tin content. If the solution containing added $SnO_2$ is kept thoroughly agitated prior to drying it is possible to make a reasonably uniform product. By this method however, there is evidence that the relatively heavier $SnO_2$ will segregate during handling and storage of the sodium caseinate after drying.

For example a one quart sample of sodium caseinate containing 0.056% Sn (as $SnO_2$) made by adding the $SnO_2$ prior to drying and of uniform composition immediately after drying was stored for 8 months and reanalyzed taking samples from the top, middle and bottom with the following results:

| Location | % Sn |
|---|---|
| Top | 0.020 |
| Middle | 0.045 |
| Bottom | 0.070 |

Soluble tin salts on the other hand do not show any tendency to settle out when added to the sodium caseinate solution and therefore result in very uniform dispersions of tin. This is true even though at the pH of sodium caseinate solution tin salts would normally be expected to hydrolyze to the insoluble hydroxide form. There is evidently a reaction between the soluble forms of tin and caseinate to form tin caseinate. This compound is in colloidal form as evidenced by the fact that when a solution containing 0.15 gram of sodium caseinate and 0.2 mg of $SnCl_2 \cdot 2H_2O$ at a pH of 6.7, is filtered through an analytical filter paper (Whatman No. 42), the tin passes through the paper with the protein. The same amount of tin salt in water at a pH of 6.7 is retained on the filter paper due to hydrolysis to the insoluble hydroxide.

It is therefore possible to make sodium caseinate with a uniform tin content merely by adding any water soluble tin salt to an aqueous sodium caseinate solution prior to spray or roller drying.

EXAMPLE I

A batch of sodium caseinate was made with the following proportions:

|  |  | Parts By Weight |
|---|---|---|
| Casein | 820 lb. | 22 |
| Water | 400 gallons | 90 |
| $SnCl_2.2H_2O$ | 330 grams | 0.02 (0.01 Sn) |
| NaOH (50%) | 37 lb. | 1 |

The tin salt was predissolved in 1 gallon of water containing 100 ml of concentrated HCl. This solution was then added to the casein-water mixture, and the caustic soda was then added to a final pH of about 6.5 The solution was spray dried and the resulting powder analyzed for tin with samples taken from the top and middle and bottom of every other bag produced.

Table I

| Bag No. | Location | % Tin |
|---|---|---|
| 1 | Top | .051 |
| 1 | Middle | .050 |
| 1 | Bottom | .050 |
| 3 | Top | .050 |
| 3 | Middle | .052 |
| 3 | Bottom | .050 |
| 5 | Top | .051 |
| 5 | Middle | .051 |
| 5 | Bottom | .052 |

EXAMPLE II

A batch of sodium caseinate was made with the following proportions:

|  |  | Parts By Weight |
|---|---|---|
| Casein | 820 lb. | 24 |
| Water | 400 gallons | 98 |
| $Na_2SnO_3.3H_2O$ | 380 grams | 0.025 (0.01 Sn) |
| NaOH (50%) | 34 lb. | 1 |

The sodium stannate was dissolved in 1 gallon of water before adding it to the bulk of the water. Then the casein was added and finally caustic soda to a pH of about 6.5. The solution was spray dried and samples taken as in Example I.

Table II

| Bag No. | Location | % Tin |
|---|---|---|
| 1 | Top | .047 |
| 1 | Middle | .048 |

Table II-continued

| Bag No. | Location | % Tin |
|---|---|---|
| 1 | Bottom | .048 |
| 3 | Top | .049 |
| 3 | Middle | .048 |
| 3 | Bottom | .049 |
| 5 | Top | .049 |
| 5 | Middle | .049 |
| 5 | Bottom | .050 |

It is quite evident that very uniform dispersion of the tin is attained by addition of water soluble tin salts to sodium caseinate during its manufacture while it is in solution form in water.

The stability of this form of traceable sodium caseinate is shown by analysis of a one quart sample after storage for seven months.

| Location | % Sn |
|---|---|
| Top | .052 |
| Middle | .050 |
| Bottom | .052 |

What is claimed is:

1. A method of producing a dried sodium caseinate product for use as a traceable additive in sausage, said product having a uniformly and stably dispersed content of tin in an amount of the order of about 0.05% by weight, comprising mixing together sodium caseinate in aqueous solution with tin in the form of a water soluble salt of tin, and spray or roller drying the resulting solution.

2. A method of producing a dried sodium caseinate product for use as a traceable additive in sausage, said product having a uniformly and stably dispersed content of tin in an amount of the order of about 0.05% by weight, comprising mixing together about 90 – 98 parts by weight of water, about 20–30 parts of casein, a small fraction of a part of a water soluble salt of tin, and about 1 part of 50% caustic soda to form a homogeneous, colloidal solution having a pH of about 6.5, and spray or roller drying said solution.

3. The method of claim 2, the tin salt being selected from the group consisting of stannous chloride and sodium stannate.

4. The method of claim 2 wherein the tin salt, dissolved in hydrochloric acid solution, was added to a casein-water mixture, the caustic soda being then added to a final pH of about 6.5.

5. The method of claim 4, the tin salt being stannous chloride.

6. The method of claim 2 wherein the tin salt, dissolved in aqueous solution, was added to a mixture of casein, water and caustic soda.

7. The method of claim 6, the tin salt being sodium stannate.

* * * * *